Figure 1:
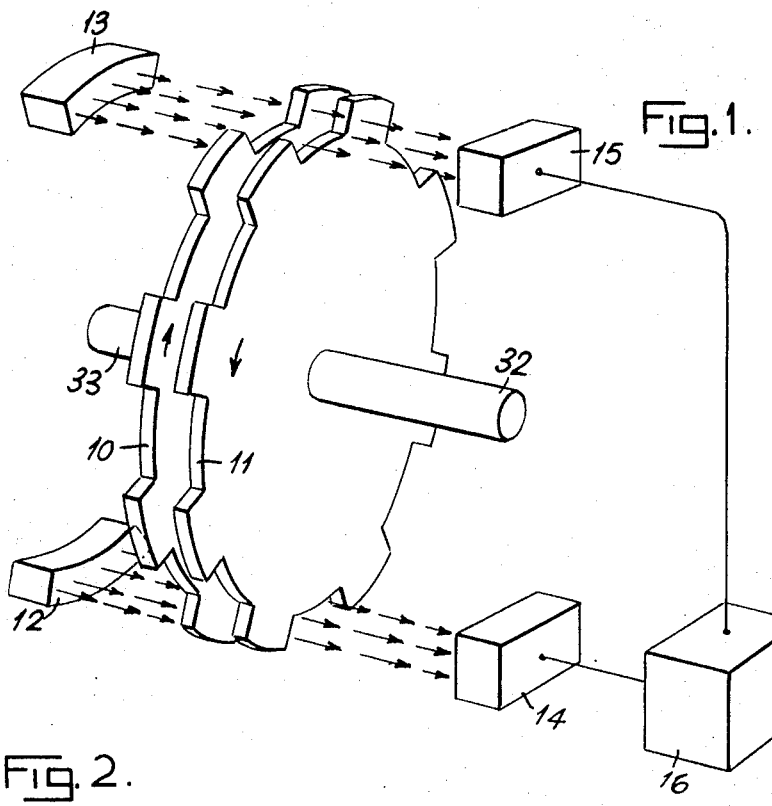

United States Patent

Stephenson

[15] 3,654,480
[45] Apr. 4, 1972

[54] TACHOGENERATORS WHICH DETERMINE THE SPEED AND ACCELERATION OF A ROTATING SHAFT BY USING TWO COUNTER ROTATING SHUTTERS

[72] Inventor: John Michael Stephenson, Leeds, England

[73] Assignee: National Research Development Corporation, London, England

[22] Filed: Oct. 8, 1970

[21] Appl. No.: 79,130

[30] Foreign Application Priority Data

Oct. 17, 1969 Great Britain......................51,137/69

[52] U.S. Cl. ............................................250/231 R, 250/233
[51] Int. Cl. ........................................................G01d 5/36
[58] Field of Search....................250/231 R, 231 SE, 233; 356/25, 26; 350/272, 274

[56] References Cited

UNITED STATES PATENTS

| 1,854,980 | 4/1932 | Butler et al. | 356/25 |
| 2,147,711 | 2/1939 | Martin | 250/231 R X |
| 2,491,240 | 12/1949 | Zmuda et al. | 250/231 R X |
| 3,098,152 | 7/1963 | Von Mathes | 250/231 SE |
| 3,193,744 | 7/1965 | Seward | 250/233 X |
| 3,400,275 | 9/1968 | Trump | 250/233 X |
| 3,482,106 | 12/1969 | Anderegg, Jr. et al. | 250/231 R |
| 3,491,247 | 1/1970 | Jones | 250/231 R |
| 3,495,452 | 2/1970 | Johnson, Jr. et al. | 250/231 R X |

FOREIGN PATENTS OR APPLICATIONS

| 146,819 | 11/1902 | Germany | 356/25 |

Primary Examiner—Ronald L. Wibert
Assistant Examiner—Edward S. Bauer
Attorney—Cushman, Darby & Cushman

[57] ABSTRACT

A tachogenerator for measuring the speed of a rotating shaft is described. The tachogenerator has two discs each with spaced peripheral slots; one disc is rotated at a constant speed and the other at the speed to be measured. A light beam is projected through the slots to a light sensitive device coupled to an electrical filter and a signal indicative of speed is obtained from the filter. Electrical noise in the signal from the light sensitive device is reduced by the filter. A further reduction in noise is obtained by using one or more pairs of light beams, with the beams diametrically opposed with respect to the discs. A light sensitive device is provided for each beam and these devices are coupled to the filter input. Instead the devices may be coupled to means for combining the pulse trains generated, to provide the output signal.

13 Claims, 11 Drawing Figures

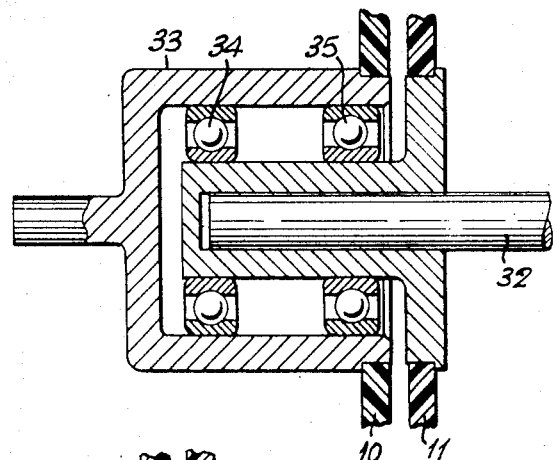
Fig.5.
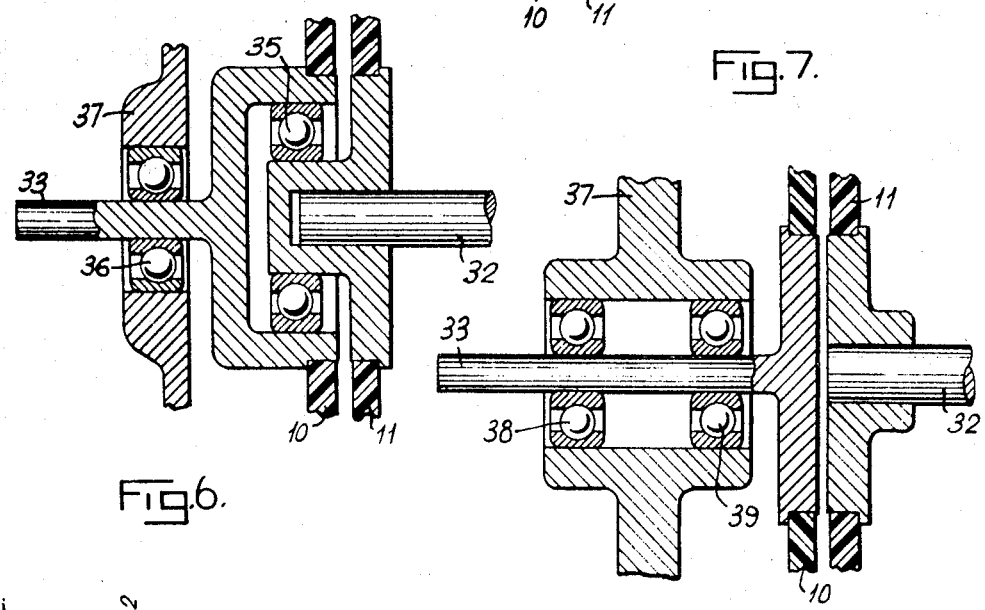
Fig.7.
Fig.6.
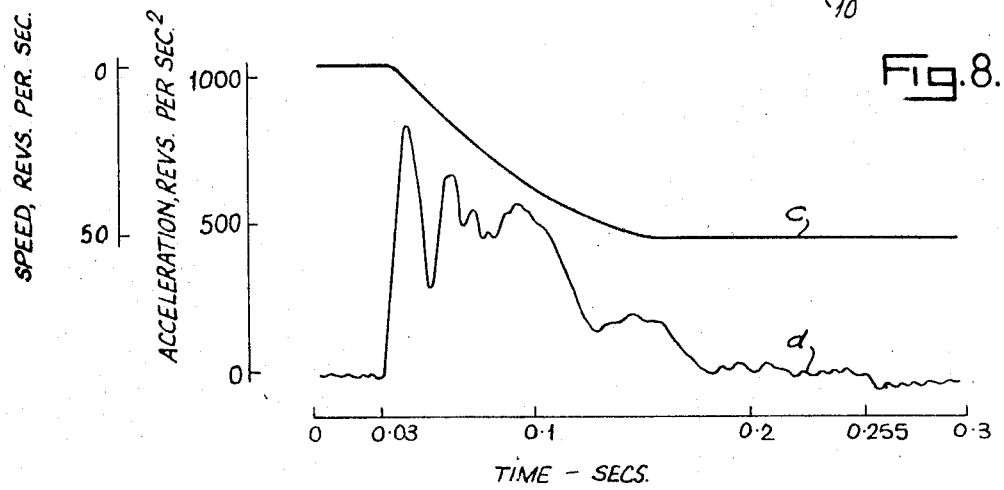
Fig.8.

TACHOGENERATORS WHICH DETERMINE THE SPEED AND ACCELERATION OF A ROTATING SHAFT BY USING TWO COUNTER ROTATING SHUTTERS

The present invention relates to the provision of a tachogenerator with a low noise electrical speed signal. If the noise level is sufficiently low, the output signal can be differentiated to provide an accurate acceleration signal.

The problem of obtaining a voltage directly proportional to the acceleration of a shaft with negligible phase distortion at, for example, 100 Hz and yet having a low noise content is considerable, being much more complex than is generally realized. Such acceleration signals are of interest in the study of the transient behavior of all types of rotating machines.

Tachogenerators of both d.c. and drag-cup types have been used, but both suffer from distortion or "noise" the frequency of which is directly proportional to speed and which therefore cannot be removed at low speeds by filtering, without severe distortion of the wanted signal. The d.c. tachogenerator is used to produce a d.c. signal proportional to the speed of rotation, which is then differentiated to give an acceleration signal. The primary source of noise is then due to the necessarily finite number of commutator segments, so that its frequency falls to zero with the speed and it cannot readily be removed. The drag-cup type can be used with d.c. excitation to produce an acceleration signal directly, or with a.c. excitation to give, after suitable rectification and filtering, a d.c. voltage which can be differentiated. The d.c. excited drag-cup has been shown to be inherently non-linear with speed and to reduce the non-linearity to an acceptable degree, only those types with small effective rotor time constants (of the order of 0.1 ms.) can be used over a wide speed range. Often both speed and acceleration signals are required, in which case a separate tachogenerator is required in conjunction with the d.c. excited drag-cup. This need for a low rotor time constant also applies with a.c. excitation. It has been found that such a tachogenerator produces a troublesome noise component in the acceleration signal which has a magnitude and frequency proportional to speed.

According to a first aspect of the present invention there is provided a tachogenerator including an input shaft coupled to a first member, means for rotating a second member at a constant speed, each member having a plurality of portions, through which light can pass, the portions being evenly spaced apart round a complete circle co-axial with the axis of rotation of that member, means for projecting a light beam through the portions of the members when, during rotation, two of the portions one on each of the members are in alignment with each other and with the light beam, the light beam having a width parallel to the plane of rotation of the members which is greater than the spacing between corresponding points in adjacent portions, or, when the spacing on one member is different from that on the other, greater than the spacing of corresponding points in adjacent portions on that member which has the larger spacing, and light-sensitive means, positioned to receive light through portions in alignment with the light beam, and coupled to an electrical filter having a cut-off frequency below the repetition frequency of light pulses incident on the light-sensitive means when only the second member rotates, the tachogenerator being such that the speed of the input shaft is proportional to the magnitude of the output signal from the filter.

The first and second members are preferably discs in which the portions are translucent or transparent slits.

In such a tachogenerator the inherent noise components (i.e. the fundamental and harmonics of the pulses forming the input to the filter) have a value of frequency directly proportional to the speed of the input shaft plus a constant value and, provided the discs are rotated in opposite directions, they are removed by the filter. The most important component of this noise is the fundamental, and if the two discs have the same number of translucent portions, $n$, it has, of course, the repetition frequency $n(V_v - V_c)$ where $V_c$ is the constant speed of the second disc and $V_v$ is the variable speed of the first disc. It is not necessary that the number of portions in the two discs be the same, a series of combinations being possible. For example, if the first disc has an integral multiple of the number of portions of the second, and if the width of the portion of the second disc is less than the distance between portions of the first, the output frequency $n_1 (V_v - V_c)$ where $n_1$ is the number of portions of the first disc. Similarly the second disc may have an integral multiple of the number of portions of the first.

The pulses from the light-sensitive means are, preferably, processed by circuits for obtaining pulses of constant voltage-time product. The filter smooths these pulses giving a d.c. output signal proportional to the rate of receiving pulses. If a d.c. source is provided to back-off the filter output signal when the input shaft is at rest, the output signal from the tachogenerator is zero at zero input speed. Further, if the input shaft is reversed a negative output signal is provided.

When both discs rotate in the same direction the frequency ($f$) of the most important noise component falls below the repetition frequency of light pulses due to the second disc alone and the cut-off frequency must be lowered. In practice if this means that the cut-off frequency would become too low, the speed ($V_c$) of the second disc may be increased.

Noise also arises from angular errors in the positioning of the slits. Fortunately, techniques have been developed for producing radial gratings of very high accuracy and these can be used to produce the discs required in this device. A further type of noise which can be produced is caused by the eccentric mounting of a disc. (In the case of a disc rotating at 3,000 rev./min. this noise will have a frequency of 50 Hz.) When both discs are running, the noise due to errors of both these kinds interact to produce a very complicated noise spectrum and additional noise components can be generated by mechanical vibration and by the second disc not running at an exactly constant speed.

Preferably a further optical system including means for projecting a light beam and light-sensitive means are positioned diametrically opposite the first mentioned such means. The pulses from the two light-sensitive means may then be combined after each pulse train has been processed by circuits for obtaining constant voltage-time product pulses; that is the pulse trains are combined before or after averaging. Theoretically the noise due to disc eccentricity, and the fundamental noise signal and odd harmonics thereof due to cumulative slit-position error is eliminated in the sum of the pulse trains.

Two additional such optical systems may be introduced on a diameter 90° to the first mentioned pair to give cancellation of both the odd and even harmonics of the noise signal due to slit position error.

Noise due to vibration and eccentric running of the discs can be reduced by careful design of the bearings for the discs. Some suitable bearings will be described below.

According to a second aspect of the present invention there is provided a tachogenerator including an input shaft coupled to a first member, means for rotating a second member at a constant speed, each member having a plurality of portions, through which light can pass, the portions being evenly spaced apart round a complete circle co-axial with the axis of rotation of that member, means for projecting a first light beam through the portions of the members when, during rotation, two of the portions one on each member are in alignment with each other and with the first light beam, means for projecting a second light beam through the portions of the members when, during rotation two of the portions one on each member are in alignment with each other and with the second light beam, the light beams being diametrically opposite one another with respect to the axis of rotation of the first and second members, and each light beam having a width parallel to the plane of rotation of the members which is greater than the spacing between corresponding points in adjacent portions, or, when the spacing on one member is different from that on the other, greater than the spacing of corresponding points in adjacent portions on that member which has the larger spacing, first and second light-sensitive means positioned to receive light from the light beams through portions in alignment with the first and second light beams, respectively, and to provide two pulse trains, and means for indicating the sum of the repetition frequencies of the pulse trains, or for indicating the magnitude of samples of the said sum, the tachogenerator being such that the speed of the input shaft is proportional to the said sum or the magnitude of the said samples.

In such a tachogenerator two digital outputs are provided in which the effect of eccentric rotation of the two members is to introduce a variation of the frequency of the two pulse trains, which constitutes an error, or noise, component in the output. But in such a tachogenerator the two pulse trains have the important property that this noise is theoretically not present in the sum of the two frequencies, which is simply proportional to the speed of the input shaft. Thus when, for example, the sum of the two frequencies is sampled in order to obtain a measure of the speed, this form of error is eliminated whatever the chosen sampling period. Noise due to fundamental and odd harmonics of cumulative slit-position error is theoretically eliminated in the same way.

Two additional optical systems may be introduced on a diameter 90° to the first mentioned pairs to give a four-output digital tachogenerator allowing cancellation in the sum of the frequencies of the noise due to both odd and even harmonics of slit-position error.

Figure 2:
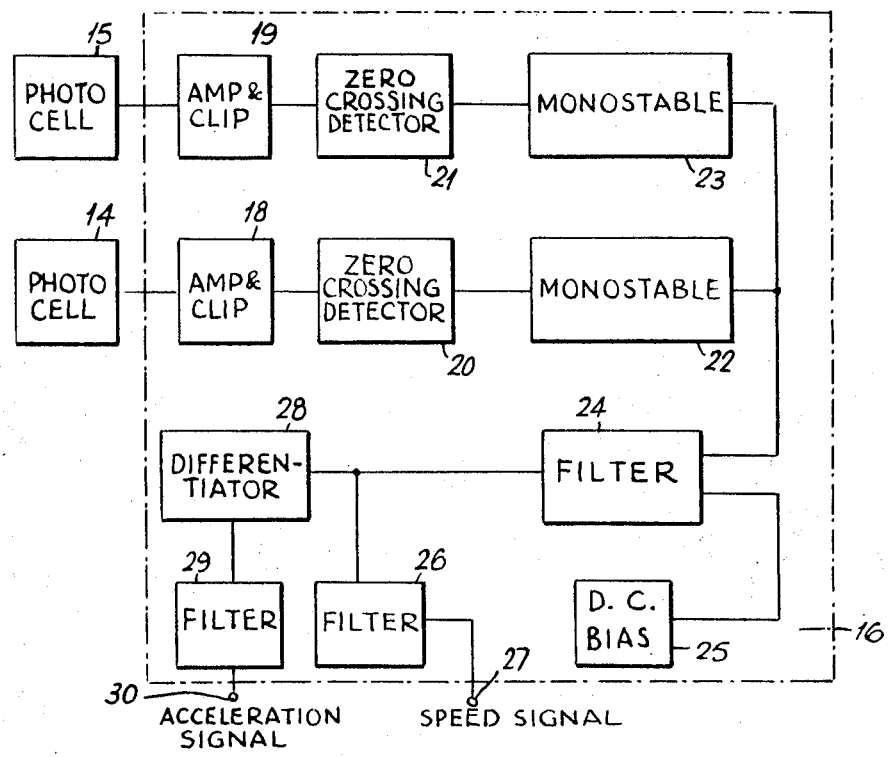
Figure 3:
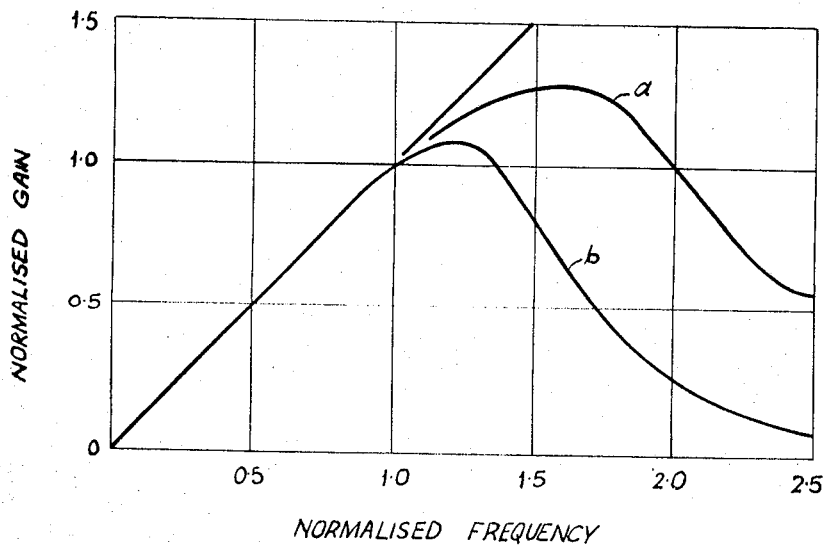
Figure 4:
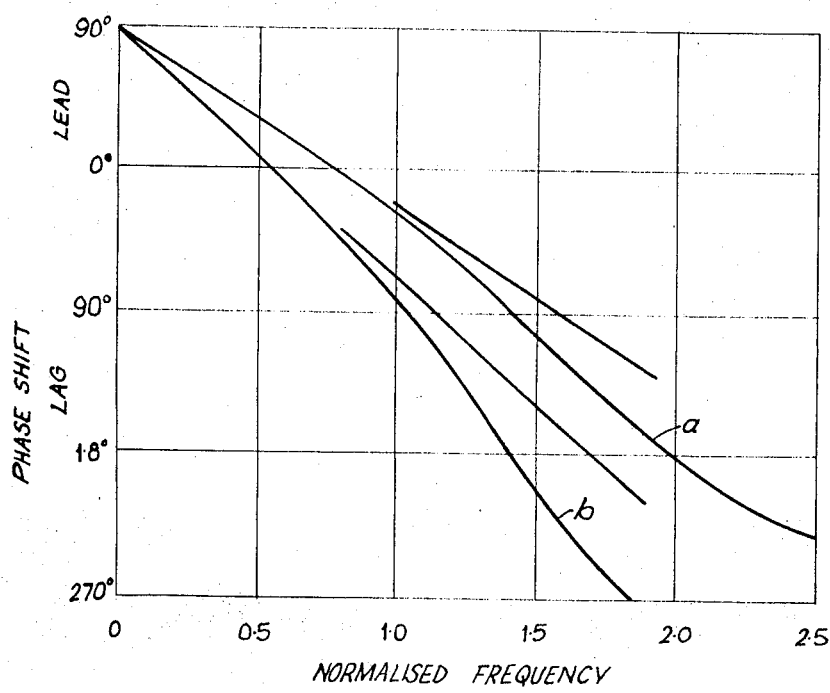
Figure 9:
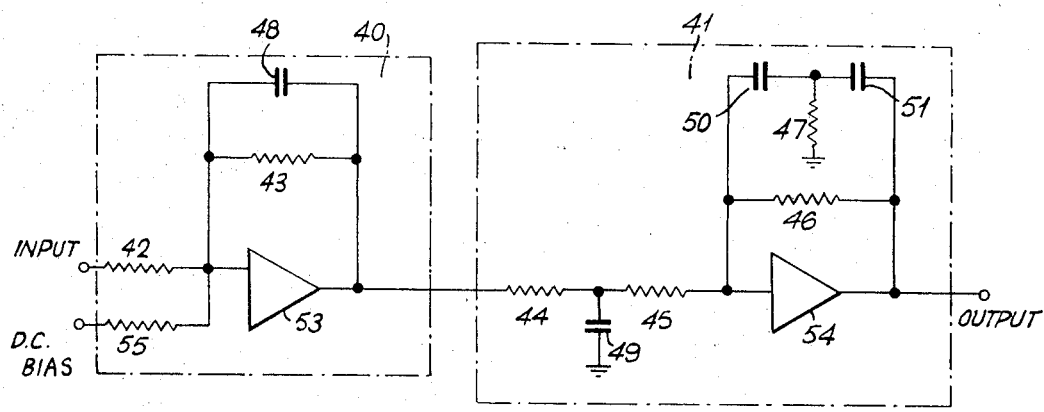
Figure 10:
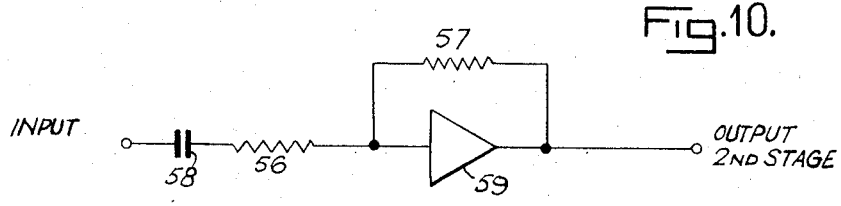
Figure 11:
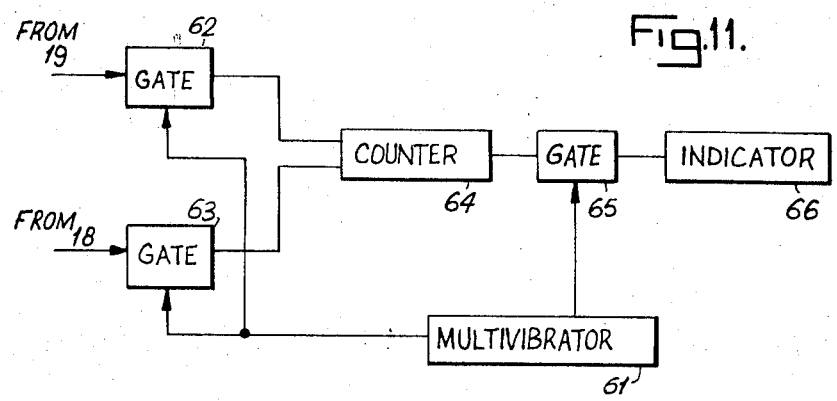

Certain embodiments of the invention will now be described, by way of example, with reference to the accompanying drawings, in which:

FIG. 1 is a schematic drawing of a tachogenerator according to a first embodiment of the present invention, FIG. 2 is a block circuit diagram of part of the tachogenerator of FIG. 1, with an acceleration output in addition to a speed output, FIG. 3 shows the normalised frequency/gain characteristics of filters and a differentiator which may be used in the tachogenerator of FIG. 1, FIG. 4 shows the frequency/phase shift characteristics of the filters and a differentiator, FIGS. 5, 6 and 7 are cross-sectional views of bearings which may be used in the tachogenerator of FIG. 1, FIG. 8 shows graphs of speed and acceleration against time obtained from the tachogenerator of FIG. 1 when coupled to a small 3-phase reluctance motor, FIG. 9 is a circuit diagram of certain filters of FIG. 2, FIG. 10 is a circuit diagram of a differentiation circuit and part of a filter of FIG. 2, and FIG. 11 is a block circuit diagram of part of a second embodiment of the invention.

In FIG. 1 a disc 10 is coupled to an input shaft 33 of the tachogenerator, and a disc 11 is driven at constant speed by, for example, a synchronous reluctance or hysteresis motor supplied from the 50 Hz mains. Although in FIG. 1 the discs are shown with the slots cut in their peripheries this is for clarity since in fact the discs are glass with a chromium deposit to make them opaque. The chromium deposit is etched away to give transparent radial-sided slits with a mark space ratio of unity. The lines are produced to a high positional accuracy of 6 seconds of arc between any two slit edges.

Light sources 12 and 13 are arranged diametrically opposite one another, in relation to the discs' axes, to project light through the slits, whenever two or more on each disc slits are coincident with the light beams, to photo-cells 14 and 15 respectively. The discs 10 and 11 are normally rotated in opposite directions and the resulting light pulses falling on the photo-cells 14 and 15 generate electrical pulses which are passed to processing circuits 16.

Each disc has 180 slits and the constant speed disc 11 is driven at 3,000 rev./min. When the variable speed disc 10 is stationary the pulse repetition frequencies from the photo-cells 14 and 15 are each 9 kHz, and when the variable speed disc has accelerated to 3,000 rev./min. these frequencies are each 18 kHz. After processing, which includes filtering to average the pulse trains, a varying magnitude d.c. speed signal is generated. When the variable speed disc 10 is at rest the speed signal has a constant magnitude which can be backed off, as will be described later.

In this situation the minimum ripple frequency is 9 kHz, and this can easily be removed by including a filter with a cut-off frequency below 9 kHz in the circuits 16.

If the input shaft reverses then the speed signal falls below the back-off level and produces a negative speed signal. In this case the minimum ripple frequency falls below 9 kHz, and if a full speed range of ± 3,000 rev./min. is required for the input shaft then the constant speed disc must be driven at a higher speed, for example, 6,000 rev./min. in which case the ripple frequency would vary between 9 kHz and 27 kHz.

Referring to FIG. 2, the pulses from the photo-cells 14 and 15 are passed to amplification and clipping circuits 18 and 19 respectively where they are squared up to remove amplitude variations before passing to the zero-crossing detector circuits 20 and 21 whose outputs trigger monostable circuits 22 and 23, respectively. Each monostable circuit produces constant voltage-time product pulses, only the repetition frequency varying with the speed of the disc 10 (any change in the pulse area with the repetition rate gives rise to non-linearity in the speed signal). The pulses from the monostable circuits 22 and 23 are passed to the common input of a filter 24 whose design will be discussed more fully below. The filter averages the pulses (i.e. removes most of the inherent noise) without distorting the required speed signal, and removes much of the noise from the other causes listed above. The filter 24 is also connected to a backing-off circuit 25 which adds a d.c. voltage at the input to the filter. This voltage is equal but opposite to the zero value of the speed signal. A speed signal has now been produced but it is further filtered by means of a filter 26 to complete the removal of as much as possible of the unwanted noise before it reaches an output terminal 27. The filters 24 and 26 have the same characteristics.

The tachogenerator also provides an acceleration signal at a terminal 30 by differentiating the speed signal in a differentiation circuit 28, and filtering in a further noise filter 29, which is basically the same as filters 24 and 26. Because filters 26 and 29 have similar characteristics, the acceleration and speed signals are in time phase having the same time delay.

The specification of the filters depends on the particular application, for example the accuracy of the initial part of a transient acceleration may be sacrificed to give a better signal/noise ratio in a later part. In general a compromise must be made between cost, noise level and accuracy, but it is nevertheless possible to produce a system in which the cut-off frequency can be selected from a set of pre-set values by means of a switch which will give satisfactory performance over a wide range of applications. In terms of frequency response the problem is to keep a flat gain response over the required pass-band which probably has 0 frequency as its lower limit), whilst introducing a sharp cut-off at the upper end. This must be done without introducing significant phase distortion within the pass-band, but it is well known that significant phase shift takes place well below the cut-off of any filter. However, for most applications the introduction of a simple time delay within the filter does not matter and this is the effect which is produced by a linear phase/frequency characteristic i.e. phase is allowed to shift within the pass-band without signal distortion. Such "linear phase" filters are well known and are described in "Synthesis of Passive Networks" by E. A. Guillemin, published by Wiley in 1957. Many filters approximate to this type of phase characteristic over the frequency range in which the gain is very nearly constant. In choosing the type of filter and the bandwidth care must be taken not to overlook the fact that in many instances it is a transient signal which is being studied, not a periodic one.

FIGS. 3 and 4 show the overall gain and phase response of the differentiation circuit 28 and the filters 24 and 29 when the filters are third-order, low-pass filters. The initial parts of the curves are all linear or nearly so and this has been projected so as to emphasise departure from linearity. The effect of the capacitor in the differentiation circuit is to modify the usual near constant gain characteristic of a filter in its passband to give the characteristic shown. The filters 24 and 26 have basically the same characteristic as that of the filter 29 but their overall characteristic is not as shown in FIGS. 3 and 4 where the effect of the differentiation circuit is taken into account. Curves a relate to maximally flat Butterworth filters. Unit frequency is usually taken as the cut-off frequency, that is where gain has fallen by 3 db, but here half the cut-off frequency has been chosen as the base value to facilitate comparison with the Chebychev filter system. The gain characteristic of a Butterworth filter has the advantage that the only maximum is at 0 frequency, i.e. the cut-off is progressive, without local maxima and minima and that therefore the higher the turnover frequency, the greater the accuracy for a given signal. Curves b relate to Chebychev filters with a variation in gain within the pass-band of approximately 1 percent for the cascaded pair. Both these well known types of filter can be easily and economically constructed. In plotting the overall characteristics, the "gain" of the differentiation of the circuit 28 has been arbitrarily chosen to be unity at unit frequency.

A practical example of the filters 24 and 26 will now be given with reference to FIG. 9. Details of the design of this type of filter, and that of the filter 29, can be found for example in "Applications Manual for Operational Amplifiers" published by Philbrick/Nexus Research, and in Application note AN-438 "Analysis and Design of Active Filters Using Operational Amplifiers" published by Motorola Semiconductor Products Inc.

Each of the filters 24 and 26 has a first stage 40 which is a first order, simple lag filter and has a second stage 41 which is a second order filter stage. Resistors 42 to 47 and capacitors 48 to 51 have the values given in the table below for different designs (i.e. Butterworth or Chebychev) and for various values of normalised frequencies. The first and second stages also include operational amplifiers 53 and 54 which are SGS type μ A709 or equivalent. Information on the use of these amplifiers in such applications as this is obtainable from "The Application of Linear Microcircuits", Volume 1 published by SGS-UK Ltd.

The gain characteristic of the first stage is given by:

$$\left|\frac{V_1}{V_i}\right| = \frac{1}{\sqrt{1+\omega^2 R_1^2 C_1^2}}$$

where $V_1$ and $V_i$ are the output voltage of the first stage and the input voltage to the filter, respectively;
$\omega$ is the angular frequency of the input signal;
$R_1$ is the resistance of the resistors 42 and 43; and
$C_1$ is the capacitance of the capacitor 48.
The gain characteristic of the second stage is given by:

where $V_o$ is the output voltage of the filter;
$R_2$ is the resistance of the resistors 44 and 45 and twice that of the resistor 47;
$R_3$ is the resistance of the resistor 46;
$C_2$ is the capacitance of the capacitor 49 and twice the capacitance of the capacitors 50 and 51.

A resistor 55 is added in the filter 24 only to allow the d.c. bias from the circuit 25 to be added to the filter input signal.

An example of the differentiator circuit 28 and part of the filter 29 is shown in FIG. 10. The filter 29 has an identical second stage (not shown in FIG. 10) to that shown at 41 in FIG. 9 but the simple lag first stage is combined with the differentiator circuit giving the circuit of FIG. 10. Resistors 56 and 57 have the values given in the table below for different designs and normalised frequencies, and values for a capacitor 58 are also given. As before an operational amplifier 59 of the SGS type μ A709 or equivalent is included.

The gain characteristic of this stage of FIG. 10 is given by:

$$\left|\frac{V_1'}{V_i'}\right| = \frac{\omega R_5 C_3}{\sqrt{1+\omega^2 R_4^2 C_3^2}}$$

where $V_1'$ and $V_i'$ are the output voltage of the stage and the input voltage to the filter, respectively;
$R_4$ is the resistance of the resistor 56;
$R_5$ is the resistance of the resistor 57; and
$C_3$ is the capacitance of the capacitor 58.

| | | Resistors | | | | | Capacitors F | | | |
|---|---|---|---|---|---|---|---|---|---|---|
| Type of stage | Normalised frequency Hz | 42, 43 kΩ | 44, 45 kΩ | 47 kΩ | 46 kΩ | 56 kΩ | 57 kΩ | 48 | 49 | 50, 51 | 58 |
| Butterworth | 100 | 20 | 4.7 | 2.35 | 9.4 | 797 | 1.6 | 0.040 | 0.338 | 0.169 | 1.0 |
| | 50 | 20 | 4.7 | 2.35 | 9.4 | 797 | 1.6 | 0.080 | 0.677 | 0.338 | 2.0 |
| Chebychev | 50 | 20 | 4.7 | 2.35 | 14.5 | 797 | 1.6 | 0.136 | 0.745 | 0.372 | 3.4 |

The circuits 18 to 26, and 28 and 29 must be very stable so as not to generate noise which falls in a required pass band and so to maintain the accuracy of calibration of the tachogenerator.

As has been mentioned, noise due to vibration and eccentric running of the discs can be reduced by careful design of bearings for the discs. In FIG. 5, the shaft 32 of the synchronous motor driving the constant speed disc 11 forms a bearing for the input shaft 33 carrying the varying speed disc 10. The shaft 33 runs on two sets of ball bearings 34 and 35. This arrangement ensures that the two discs have the same axis of rotation and therefore run co-axially. A somewhat similar arrangement is shown in FIG. 6 except that only the ball bearing 35 is employed while a further ball bearing 36 in the main casing 37 is provided for the input shaft 33. In both these arrangements it is possible for the functions of shafts 32 and 33 to be reversed i.e. for 33 to be the shaft of the constant-speed motor.

In FIG. 7 the shaft 32 of the synchronous motor driving the constant speed disc 11 is entirely separate from the input shaft. Two ball bearings 38 and 39 support the input shaft 33 in the main casing 37.

The arrangement of FIG. 7 completely isolates the two discs mechanically. It is even possible for the bearings for the disc 10 to be those of the apparatus to which it is connected, thus overcoming the problem of coupling. The tachogenerator is then an integral part of some other piece of equipment, e.g. a servo-motor/tacho unit. This arrangement is expected to give $$\left|\frac{V_o}{V_1}\right| = \frac{R_3}{2R_2} \frac{1}{\sqrt{1-\omega^2\left[R_3 R_2\left(\frac{C_2}{2}\right)^2 - R_2^2\left(\frac{C_2}{2}\right)^2\right] + \omega^4 R_3^2\left(\frac{R_2}{2}\right)^2\left(\frac{C_2}{2}\right)^4}}$$

the lowest mechanical noise component, especially if multiple optical systems are used.

FIG. 6 is a combination of the bearings of FIGS. 5 and 7 and is expected to offer the most compact system, as shown in the drawings, which all have the same distances between bearings. The shared bearing ensures good concentricity of the two discs (as in FIG. 5), but the axial location of disc 10 is more easily arranged.

Using maximally flat Butterworth filters giving a combined characteristic $a$ and with a unit frequency of 100 Hz, the embodiment of FIGS. 1 and 2 has the performance illustrated by FIG. 8. The speed/time $c$ and acceleration/time $d$ traces for the acceleration from rest to 3,000 rev./min. of a small conventional 3-phase reluctance motor are shown. From time zero to 0.03 s, only the constant-speed disc is rotating. At 0.03 s the reluctance motor is switched on and runs up to reach a steady synchronous speed at about 0.22 s. At 0.255 s the motor is switched off and a small negative acceleration signal is recorded as the motor slows down. Note that the "noise" amplitude is about the same with both discs running at 3,000 rev./min. as with only one rotating, having a peak to peak amplitude of about 1.8 percent of 1,000 rev./s$^2$, or 114 rad/s$^2$. The absence of a marked 50 Hz (fundamental) component from the noise is notable, but it does contain a very strong 100 Hz (second harmonic) component. This component would be reduced by a factor of 0.13 with the use of Chebychev filters having a unit frequency of 50 Hz, but would be unchanged with the same reduction in the unit frequency of the present Butterworth filters.

The embodiment specifically described above has a noise level of ±5.7% of 1,000 rad/s$^2$ when operating with an overall amplitude response up to 100 Hz of accuracy +0, −1.6% (+0, −0.14 db and a phase response departing from the linear by +0, −3°. The speed voltage has a negligible noise content and is stable and linear to better than 0.5 percent. There is no doubt that the embodiment is capable of considerable development and should easily reach a noise figure of ±1 percent of 1,000 rad/s$^2$ with a bandwidth of ±0, −1 percent at 100 Hz and negligible phase distortion, and a steady-state accuracy for the speed signal of 0.1 percent, if full advantage is taken of the engineering facilities appropriate to the manufacture of precision electro-mechanical devices.

In another embodiment of the invention, the outputs of the amplification and clipping circuits 18 and 19 may be coupled to the circuits of FIG. 11 instead of being coupled in the way shown in FIG. 2.

A multivibrator 61 is coupled to open gates 62 and 63 when in one of its two conduction states. Pulses from the circuits 18 and 19 then pass to a counter 64. When the multivibrator 61 changes its conduction state the gates 62 and 63 close but a transfer gate 65 opens transferring the number accumulated by the counter to an indicator 66. The counter 64 is reset after each transfer and the indicator 66 is reset immediately before each transfer.

Thus the indicator shows samples of the sum of the two light pulse trains received by the photo-cells 15 and 16, and accumulated during one period of the bistable circuit 61.

While in the embodiments described a specific number and design of slits has been given other arrangements are suitable; for example, the slits need not be radial-sided, the number of slits may, of course, be varied, and any accurately defined slots or holes may be used.

Further, no restriction of any kind is implied in respect of the speeds of the discs or in the means of driving one of them at a precisely constant speed.

Nor is any restriction implied in the number and geometrical arrangement of the light-sensitive means.

Instead of supplying the motor driving the constant speed disc from the mains, greater speed stability can be achieved by driving the motor from balanced 2 or 3-phase voltages synchronised to a crystal oscillator.

Many different variations are also possible in the circuits 16 for processing the signals from the light-sensitive means.

I claim:

1. A tachogenerator including an input shaft coupled to a first member, means for rotating a second member at a constant speed, each member having a plurality of portions, through which light can pass, the portions being evenly spaced apart round a complete circle co-axial with the axis of rotation of that member, means for projecting a light beam through the portions of the members when, during rotation, two of the portions one on each of the members are in alignment with each other and with the light beam, the light beam having a width parallel to the plane of rotation of the members which is greater than the spacing of corresponding points in adjacent portions on that member which has the larger spacing, and light-sensitive means, positioned to receive light through portions in alignment with the light beam, and coupled to an electrical filter having a cut-off frequency below the repetition frequency of light pulses incident on the light-sensitive means when only the second member rotates.

2. A tachogenerator according claim 1 including further means for projecting a further light beam through the portions of the members when, during rotation, two of the portions one on each of the members are in alignment with each other and with the further light beam, the further light beam having a width parallel to the plane of rotation of the members which is greater than the spacing of corresponding points in adjacent portions on that member which has the larger spacing, and further light sensitive means, positioned to receive light through portions in alignment with the further light beam, and coupled to the filter.

3. A tachogenerator according to claim 2 including a plurality of optical systems each comprising two means for projecting a light beam through the portions of the members when, during rotation, two of the portions one on each of the members are in alignment with each other and with the light beam, each light beam having a width parallel to the plane of rotation of the members which is greater than the spacing of corresponding points in adjacent portions on that member which has the larger spacing, and two light sensitive means one for each light beam and positioned to receive light through portions in alignment with that light beam, the first and second members having a common axis of rotation, the optical system being evenly spaced round a circle co-axial with the common axis, and the light sensitive means of the optical systems being coupled to the electrical filter.

4. A tachogenerator according to claim 2 including two pulse-processing means, each coupled to one of the light-sensitive means, particular thereto, each pulse-processing means being constructed to generate a train of voltage pulses, in which each pulse corresponds to a light pulse received by the light-sensitive means coupled to that pulse-processing means, and in which the product of the duration of each voltage pulse and the voltage amplitude of the pulse has a constant value.

5. A tachogenerator according to claim 2 including a direct current source coupled to the filter, the source applying a voltage equal and opposite to that of the filter in the absence of the source, when the input shaft is at rest but the second member rotates at the constant speed.

6. A tachogenerator according to claim 2 including a differentiation circuit coupled to the output of the filter for providing a signal indicative of acceleration of the input shaft.

7. A tachogenerator according to claim 2 wherein the first and second members are discs and the portions are translucent or transparent slits in the discs.

8. A tachogenerator according to claim 2 wherein the first and second members each have the same number of portions.

9. A tachogenerator according to claim 2 wherein the means for rotating the second member is a motor and the output shaft of the motor carries a bearing for the said input shaft, the tachogenerator being such that the first and second members have the same axis of rotation.

10. A tachogenerator according to claim 9 including a casing for the motor, wherein the input shaft also has a bearing in the casing wall.

11. A tachogenerator according to claim 2 wherein the input shaft and a shaft carrying the second member are mechanically isolated from one another.

12. A tachogenerator including an input shaft coupled to a first member, means for rotating a second member at a constant speed, each member having a plurality of portions, through which light can pass, the portions being evenly spaced apart round a complete circle co-axial with the axis of rotation of that member, means for projecting a first light beam through the portions of the members when, during rotation, two such portions one on each member are in alignment with each other and with the first light beam, means for projecting a second light beam through the portions of the members when, during rotation two of the portions one on each member are in alignment with each other and with the second light beam, the light beams being diametrically opposite one another with respect to the axis of rotation of the first and second members, and each beam having a width parallel to the plane of rotation of the members which is greater than the spacing of corresponding points in adjacent portions on that member which has the larger spacing, first and second light-sensitive means positioned to receive light from the light beams through portions in alignment with the first and second light beams, respectively, and to provide two pulse trains, and means for indicating the sum of the repetition frequencies of the pulse trains.

13. A tachogenerator according to claim 12 including a plurality of optical systems each comprising two means for projecting a light beam through the portions of the members when, during rotation, two of the portions one on each member are in alignment with each other and with one of the light beams, each light beam having a width parallel to the plane of rotation of the members which is greater than the spacing of corresponding points in adjacent portions on that member which has the larger spacing, and two light-sensitive means one for each light beam and positioned to receive light through portions in alignment with that light beam the first and second members having a common axis of rotation, the optical system being evenly spaced round a circle co-axial with the common axis, and the light-sensitive means of the optical systems being coupled to the means for indicating the sum of the repetition frequencies of the pulse trains, or for indicating the magnitude of the samples of the said sum.

* * * * *